UNITED STATES PATENT OFFICE.

MORDUCH L. KAPLAN, OF BROOKLYN, NEW YORK, ASSIGNOR TO BEACON MINIATURE ELECTRIC CO., INC., OF NEW YORK, N. Y., A CORPORATION OF NEW YORK.

GALVANIC CELL.

1,166,414.  Specification of Letters Patent.  Patented Dec. 28, 1915.

No Drawing.  Application filed May 1, 1915.  Serial No. 25,164.

*To all whom it may concern:*

Be it known that I, MORDUCH L. KAPLAN, a citizen of the United States, and a resident of Brooklyn, in the county of Kings and State of New York, have invented certain new and useful Improvements in Galvanic Cells, of which the following is a specification.

This invention relates to galvanic cells of the Leclanche type especially to the form known as the dry battery and in particular a small portable type of battery called the miniature cell and is concerned more directly with the depolarizing portion of such galvanic cell all as more particularly hereinafter described in detail and as set forth in the appended claims.

It is customary to make use of manganese peroxid both the natural and artificially prepared as a depolarizing agent in cells of different types and in Letters Patent No. 1,109,129 granted to me Sept. 1, 1914, I have disclosed a form of manganese material, namely, manganous polymanganite which may be used as a depolarizing agent. Such product was illustratively prepared by reacting with a manganous salt on blue hydrated potassium manganite.

According to the present invention an acid salt of polymanganic acid preferably the manganous salt is employed as a depolarizing agent preferably in conjunction with graphite or other form of conducting carbon preferably in certain proportions as will be hereinafter set forth.

The acid manganous polymanganite may be regarded as somewhat similar to acid salts such as potassium hydrogen sulfate or sodium bisulfate and the like. It has the advantage of a certain measure of reactivity due to its acid character and to its porous though dense texture as to make it of importance as a depolarizing agent.

Acid manganous polymanganite may be prepared by reacting on manganous polymanganite or manganous potassium polymanganite with dilute acid in amount sufficient to remove approximately one-half on the combined base. This may be accomplished by suitable digestion, filtration and washing and the acid salt largely or wholly freed from water-soluble material may be dried gently to retain it in a hydrated condition or it may be more strongly dried to remove more or less of the water of hydration and if desired may be rendered anhydrous. This material is incorporated with for example finely divided graphite preferably in the proportion of six parts of the former to four parts of the latter and is compressed into the shape desired as a depolarizing mass. Ordinarily the depolarizing material is molded around a rod of carbon which is introduced into a single container in which the electrolyte is placed.

Owing to the acid character of the manganous salt produced the material reacts with hydrogen to most excellent advantage. Whether or not this peculiar degree of reactivity is due to some condition of ionization has not been determined by me but I believe when the galvanic cell is in operation a certain slight degree of dissociation occurs which gives rise to ions of a highly responsive nature which enables auto-reduction of the depolarizing mass to progress rapidly and effectively so that polarization is entirely prevented. In a miniature battery this condition is of great importance because the demands on such battery of small compass are very great and polarization of the electrode oftentimes occurs with less reactive depolarizers.

What I claim is:

1. A galvanic cell containing acid manganous polymanganite as a depolarizing agent.

2. A galvanic cell containing an acid salt of polymanganic acid as a depolarizing agent.

3. A galvanic cell containing a non-neutral salt of polymanganic acid as a depolarizing agent.

4. A galvanic cell containing acid manganous polymanganite in a hydrated condition as a depolarizing agent.

5. As a depolarizing agent a mixture of conducting carbon and an acid salt of polymanganic acid.

6. As a depolarizing agent a mixture of conducting carbon and a hydrated acid salt of polymanganic acid, said mixture of conducting carbon and acid manganous polymanganite being in the ratio of about four to six.

Signed at New York city, in the county of New York and State of New York, this 28th day of April, A. D. 1915.

MORDUCH L. KAPLAN.

Witnesses:
ARTHUR MARION,
CHAS. C. GILL.